Nov. 13, 1951 E. L. C. WHITE 2,574,946

SCANNING CIRCUIT

Filed Nov. 29, 1947

Inventor:
Eric Lawrence Casling White
By J. O. Ollier,
Attorney

Patented Nov. 13, 1951 2,574,946

UNITED STATES PATENT OFFICE 2,574,946

SCANNING CIRCUIT

Eric Lawrence Casling White, Richings Way, Iver, England, assignor to Electric & Musical Industries Limited, Hayes, Middlesex, England Application November 29, 1947, Serial No. 788,799
In Great Britain December 19, 1946

7 Claims. (Cl. 315—24)

The present invention relates to circuit arrangements for scanning cathode ray beams in cathode ray tubes and has particular but not exclusive reference to tubes in which an image formed on the target electrode of the tube suffers from "spiral distortion."

One instance of such distortion arises in the use in a television transmitter of a transmitting tube that focuses an electron image on to the target electrode or mosaic screen by means of a magnetic lens. It is known that in such tubes the electron image suffers a rotation which is not simply a rotation of the image as a whole but is one in which elements of the image more remote from the centre of the image are more rotated than elements less remote. If such an image is scanned by causing the beam of the tube to trace a series of straight lines to form a rectangular raster the reconstituted image exhibits the twisting which is commonly referred to as spiral distortion.

One object of the present invention is to provide an improved circuit arrangement whereby a spirally-distorted image can be scanned in such a manner than an image reconstituted from said scanned distorted image does not exhibit any substantial degree of spiral distortion.

According to the present invention a circuit arrangement is provided for scanning a cathode ray beam over a target in a cathode ray tube in which an image formed on said target suffers from spiral distortion comprising individual means for deflecting said beam in two separate directions and in which the deflecting waveforms applied to said means are such that the cathode ray beam is caused to trace a spirally-distorted raster corresponding to the spiral distortion in said image.

Spiral distortion is also known to arise in other forms of television transmitting tubes due to the scanning beam being required to pass through a non-uniform electric retarding field in the presence of a uniform axial magnetic field. In such forms of tube, the scanning beam is maintained in focus and is also caused to approach the target electrode of the tube and to impinge on said target electrode substantially normally as a result of said uniform magnetic field. In order to stabilise the target electrode substantially at the potential of the cathode of said tube, the electron beam, before impinging on the target electrode is retarded due to said non-uniform electric retarding field. The raster traced by the scanning beam in this form of tube is spirally distorted and according to another feature of the invention such spiral distortion is reduced or eliminated by causing the scanning beam to be deflected in such a manner that it would normally scan a spirally-distorted raster, the deflecting action of the beam being such that when it is passed through said non-uniform retarding field the resultant scanned raster is of rectangular form.

According to another aspect of the invention there is provided a circuit arrangement for scanning a cathode ray beam to produce a spirally distorted deflecting action comprising means for generating sawtooth variations at line and frame frequencies, means for modulating the frame frequency variations with a modulation comprising a combination of line and frame frequency variations and means for modulating the line frequency variations with a modulation comprising a different combination of line and frame frequency variations and means for deflecting the cathode ray beam by said modulated line and frame frequency variations.

In order that the invention may be clearly understood and readily carried into effect it will now be described with reference to the accompanying drawings in which.

Figure 1:
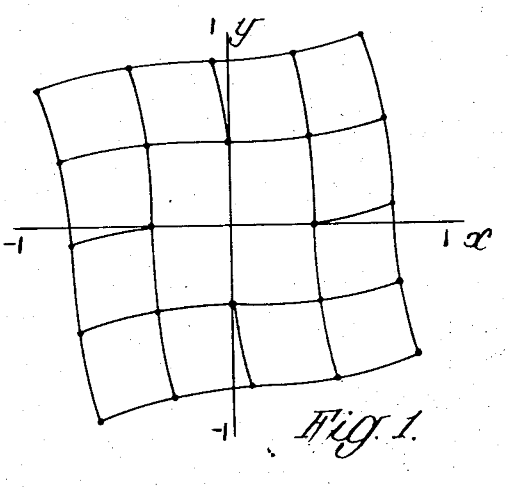
Figure 1 is a diagram illustrating the nature of spiral distortion.

Referring to Figure 1 there is indicated the general character of spiral distortion, such as arises for example due to the use of a magnetic lens in a television transmitting tube. If an image of a rectangular mesh were focused by a magnetic lens on to the target electrode of such a tube the image would appear as shown in Figure 1 which is a graphical plot of a number of points of the mesh. The points in the figure are the crossing points of the mesh and as shown a twist is imparted to the mesh so that it is spirally distorted. The points of the mesh are plotted as shown according to a Cartesian $(x, y)$ system of coordinates and the spiral distortion at any points may be specified by the departure $(\delta x, \delta y)$ of the point from its undistorted position. If the precise nature of the components $\delta x$, $\delta y$ is known then by the use of suitable deflecting waveforms in a scanning system employing orthogonal deflections as is common in television the scanning beam can be made in precise conformity with the spiral distortion specified by $(\delta x, \delta y)$. Thus if orthogonal deflecting fields of suitable magnitude and proportional respectively to $\delta x$, $\delta y$ are generated in effective superposition on respective given orthogonal deflecting fields as commonly employed the scanning due to the latter fields can be modified precisely by the spiral distortion $(\delta x, \delta y)$. That is to say every point of deflection of the beam will be displaced to the extent $(\delta x, \delta y)$ from the point whose position it would occupy if deflection took place solely under the influence for example of linear sawtooth deflecting waveforms.

The form of the components $\delta x$, $\delta y$ may be determined by considering the position of a scanning point not with reference to a Cartesian system, but with reference to a polar system, that is to say with reference to polar coordinates $r$, $\phi$. In these co-ordinates the spiral distortion at any point $(r, \phi)$ may be specified simply by the differential $\delta\phi$. This assumes as may conveniently be done that the distortion occurs about the origin of co-ordinates. In general, having made such an assumption, $\delta\phi$ will be simply some function of $r$, so that the distortion will be given by an equation $$\delta\phi=f(r)$$

As the distortion is symmetrical in the sense that it is independent of $\phi$ it follows that it must be the same for the point $(-r, \phi)$ as for the point $(r, \phi)$, so that $f(r)$ must be an even function of $r$. That is to say $f(r)$ may be expanded according to $$f(r)=a+br^2+cr^4+\ldots$$

The Cartesian form of the distortion may now be calculated by means of the transformation equations $$x=r\cos\phi$$
$$y=r\sin\phi$$

From these it follows that $$\delta x=-y\delta\phi$$
$$\delta y=x\delta\phi$$

Thus if the constant term $a$ in the expansion of $f(r)$ is omitted, as may be done on the grounds that it represents only a homogeneous rotation that may be compensated by simple means such as by rotating the deflecting coils of the scanning system as a whole, then finally $$\delta x=-y(b(x^2+y^2)+c(x^2+y^2)^2+\ldots)$$
$$\delta y=x(b(x^2+y^2)+c(x^2+y^2)^2+\ldots)$$

These equations specify the general form of spiral distortion in Cartesian co-ordinates. If $x$ and $y$ are the scanning variables in a television scanning system these equations show how spiral distortion components $\delta x$, $\delta y$ superposed respectively on $x$ and $y$ for imparting spiral distortion to the scanning must be related to $x$ and $y$.

Figure 2:
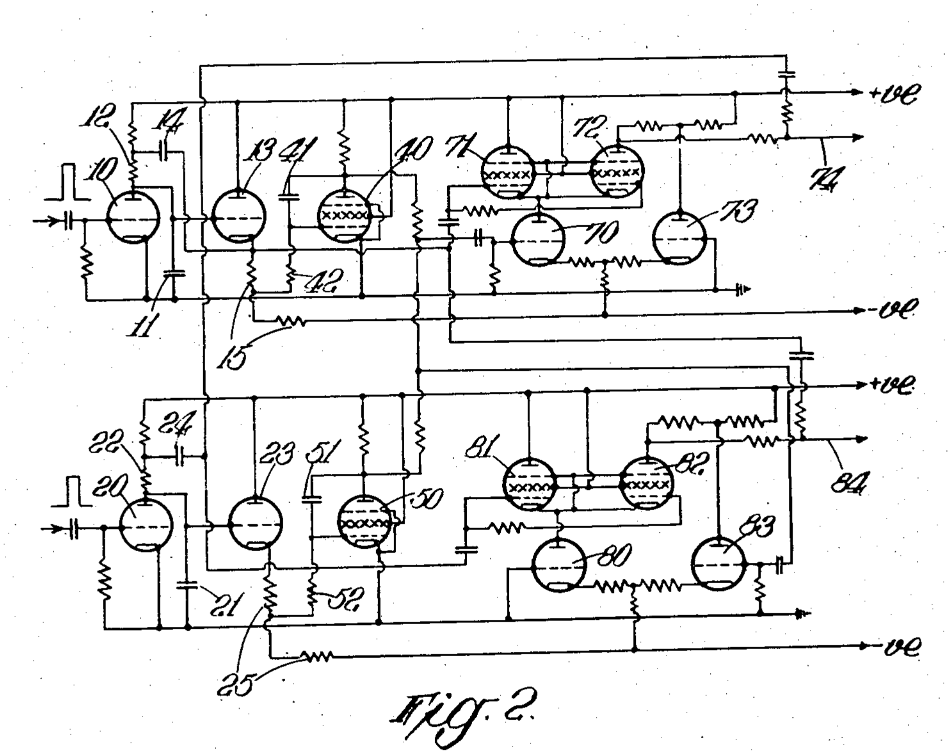
Figure 2 is one form of circuit arrangement for setting up deflecting waveforms, for example for television scanning, to eliminate or reduce spiral distortion in the television image.

Figure 2 illustrates a circuit arrangement for generating suitable deflecting waveforms occurring at line and frame frequency and which, when applied to the line and frame frequency deflecting means of the cathode ray tube, will cause the beam to follow the spiral distortion of the image. This circuit operates under the control of impulses occurring at the line and frame frequencies, which impulses may be the line-frequency and frame-frequency synchronising impulses of a television system and will hereinafter be assumed to be such. The circuit includes means for generating under the separate control of said impulses two sawtooth variations of potential, namely, a sawtooth variation $x$ repeating at line-repetition frequency and a sawtooth variation $y$ repeating at frame-repetition frequency. The circuit includes also means by which first-order spiral-distortion components are generated and superposed individually on the variations $x$ and $y$. Thus the circuit has two outputs supplying variations $$x-by(x^2+y^2)$$
$$y+bx(x^2+y^2)$$

respectively.

Referring to the circuit of Figure 2 in greater detail the frame-frequency impulses are applied to the control grid of the valve 10. This valve is a discharger valve for the charging condenser 11 which is arranged to be charged through a charging resistance 12 in the anode circuit of valve 10. Condenser 11 charges in linear manner with time and is discharged with every pulse incident upon the control grid of valve 10 so that there is developed across the condenser 11 a sawtooth variation $y$ repeating at frame-frequency. The variation $y$ is repeated at the cathode of valve 13 which is arranged to operate in cathode-following manner. For the purpose of generating a more linear sawtooth variation the variations appearing at the cathode of valve 13 are fed back through condenser 14 to a point on the charging resistance 12 in the anode circuit of valve 10. Means for generating a line-frequency sawtooth variation and essentially identical to that just described for generating a frame-frequency sawtooth variation is shown comprising discharger valve 20, charging condenser 21, charging resistance 22, cathode-following repeater valve 23 and feedback condenser 24. The line-frequency controlling impulses are applied to the control grid of valve 20 and a sawtooth variation of potential repeating at line-frequency is set up at the cathode of valve 23.

Having generated the main scanning variations $x$ and $y$ the respective first-order spiral-distortion terms $$-by(x^2+y^2)$$

and $$bx(x^2+y^2)$$

are generated as follows. A fraction of the potential variation $y$ set up at the cathode of the cathode follower valve 13, namely the potential appearing at a tapping point on the cathode-circuit impedance 15 of said valve is employed to control valve 40 which is arranged to integrate the potential applied to control it and accordingly set up at its anode a variation of form $-y^2$.

The variation $y^2$ is set up at said anode in the following way: Since the variation $y$ is of sawtooth form and may be regarded as lying equally positive and negative about a zero value it may be represented by the expression $$y_0\left(\frac{2t}{T}-2n-1\right)$$

in which $n$ is an integer increasing by unity with the completion of each forward stroke of the sawtooth, and $t$ is the time. The period of each forward stroke is supposed to be T, and $y_0$ is the peak positive or negative amplitude. Integrating $y$ with respect to the time $t$ it may be shown that $$\int ydt=\frac{y_0}{T}\left\{\left(\frac{Ty}{2y_0}\right)^2-\frac{T^2}{4}\right\}$$

which represents a continuous variation formed of a uniform succession of symmetrical parabolic variations the centre of the parabolic portions occurring at $$t=\frac{T}{2}, \frac{3T}{2}, \frac{5T}{2}, \text{etc.}$$

at which instants the integral has the minimum value $$-\frac{y_0T}{4}$$

and $y$ is zero.

In order that the circuit associated with valve 40 shall perform this integration the condenser 41 is arranged to couple the anode of valve 40 to its control electrode so that a low impedance is presented thereat in the operating range of frequencies and said potential employed to control valve 40 is applied to said control electrode over resistance 42 which is large compared with said low impedance presented at said control electrode. In similar manner the elements comprising the valve 50, condenser 51 and resistance 52 co-operate with cathode-follower valve 23 and cathode impedance 25 to set up at the anode of valve 50 a variation of the form $-x^2$.

In order to generate the first-order spiral-distortion term $$-by(x^2+y^2)$$

the variations of type $-x^2$ and $-y^2$ set up respectively at the anodes of valves 50 and 40 are together applied to the control electrode of the modulator valve 70 connected in the common-cathode circuit of the pair of valves 71 and 72 which are modulated by the valve 70 and have variations $y$ applied to their control electrodes. The arrangement is such that a product term of form $$-y(x^2+y^2)$$

is generated at the anode of valve 72. Valve 73 is so controlled by common-cathode coupling with the valve 70 and its anode circuit is so connected with the anode circuit of valve 72 that variations of form $$x^2+y^2$$

are prevented from being set up at the anode of valve 72. Variations $x$, however, from the cathode of valve 22 are combined with the variations generated at the anode of valve 72 to give the required complete line-scanning waveform $$x-by(x^2+y^2)$$

at output lead 74.

The required complete frame scanning waveform $$y+bx(x^2+y^2)$$

is set up at output lead 84 in a very similar manner. Valve 80 is a modulator valve corresponding to valve 70 and modulating the pair 81 and 82 to the control electrodes of which are applied variations $x$. Valve 80 is however cathode-controlled from the cathode circuit of valve 83 to the control grid of which latter valve are applied the combined variations $-x^2$ and $-y^2$. At the same time, apart from the difference that valve 83 drives valve 80 whereas with the corresponding valves 73 and 70 the driving relationship is reversed, the function of valve 83 is similar to that of the corresponding valve 73. Thus it serves to prevent variations of form $$x^2+y^2$$

appearing at the anode of valve 82. With this arrangement variations of form $$x(x^2+y^2)$$

are set up at the anode of valve 82 and by combination with the variation $y$ by a suitable combining circuit the required variation $$y+bx(x^2+y^2)$$

is set up at lead 84. The interchange of driving relation between valves 80 and 83 as compared with their counterparts 70 and 73 has the effect of setting up the desired product variation $$x(x^2+y^2)$$

at the anode of valve 82 with the correct sign.

It will be appreciated that although the output variations from the circuit of Figure 2 are of potential character and can be applied to deflecting plates of a cathode ray tube they may be converted if desired to current variations of the same form by known means so as to be applicable to deflecting coils of a cathode ray tube.

Amplitude control of the scanned area may be incorporated in the circuit of Figure 2 in the following way. If the linear dimensions of the scanned area are increased in the ratio of $\lambda$ to unity then clearly the deflections $$x-by(x^2+y^2)$$

$$y+bx(x^2+y^2)$$

become $$\lambda x-b\lambda y(\lambda^2x^2+\lambda^2y^2)$$

$$\lambda y+b\lambda x(\lambda^2x^2+\lambda^2y^2)$$

This transformation may be obtained by connecting potentiometers between the cathodes of valves 13 and 23 and earth so as to provide the principal deflection terms $\lambda x$, $\lambda y$ and furthermore by feeding each integrating valve 40 and 50 with the outputs from these potentiometers though however in each case a second potentiometer ganged to the first so that the potentials actually applied to the ends of resistances 42 and 52 remote from the control grids of valves 40 and 50 are of the form $\lambda^2y$, $\lambda^2x$.

While the invention has been described with particular reference to Figure 2, it will be appreciated that the required deflecting waveforms can be obtained from other circuit arrangements such as those described in the specification of United States patent application Ser. No. 6,053, filed February 3, 1948. Alternatively, the integrating valves 40 and 50 may be replaced by the circuits described in the specification of United States patent application Ser. No. 9,232, filed February 18, 1948. In this case the signal which is applied in Figure 2 to the control grid of valve 40 is applied simultaneously to two control grids of a multigrid valve so that the output is proportional to the square of the instantaneous amplitude of the input signal. Likewise, the signal which is applied in Figure 2 to the control grid of valve 50 is similarly applied to two control grids of a multigrid valve. Such a form of circuit has the advantage that in obtaining amplitude control of the scanned area only one potentiometer is required at the output of each of the valves 13 and 23 instead of the two ganged potentiometers proposed above, because for example, the output $\lambda y$ from the valve 13 when applied to the multigrid valve gives an output $\lambda^2y^2$ at the grid of the modulator valve 70.

Furthermore, the modulator circuits comprising valves 70, 71, 72, 73 and 80, 81, 82, 83 can be replaced by known modulator circuits or by the circuits described in the specification of United States patent application Ser. No. 9,412, filed February 19, 1948, and issued March 14, 1950, as Patent No. 2,500,480, which allow linear modulation to take place between the applied signals $x$ and $(x^2+y^2)$, and between the applied signals $y$ and $(x^2+y^2)$.

In special cases, for example in small or portable equipment, it may suffice to generate deflecting waveforms of the form $$x-by^3$$

$$y+bx^3$$

instead of the more exact form $$x-by(x^2+y^2)$$

$$x+bx(x^2+y^2)$$

It will be clear that the approximate forms are readily obtained from the circuit of Figure 2 or its modifications merely by arranging that the outputs of valves 40 and 50 only are applied to modulator valves 70 and 83 respectively, that is to say, separately and respectively rather than in combination as described with reference to Figure 2.

In order to avoid the complex circuits required for the production of the exact deflecting waveforms necessary to compensate for spiral distortion, a compromise solution may be adopted in which the line deflecting waveform comprises a portion of a sinusoidal wave at the frame frequency added to a line frequency sawtooth and the frame deflecting waveform comprises a portion of a sinusoidal wave at line frequency added to a frame frequency sawtooth, so that the respective deflecting waveforms are of the form $$x-a \sin ky$$

$$y+a \sin kx$$

where $k$ is constant.

It will be appreciated that in a cathode ray tube where the axis of the electron gun is not normal to the surface which is to be scanned, keystone modulation of line amplitude by the frame variation must be carried out in suitable manner, as by means of a balanced modulator after the spiral correction has been made, that is to say, in a circuit fed by the outputs of the circuits described with reference to Figure 2.

Although in the above specific description of the invention the latter is applied for the purpose of correcting spiral distortion arising out of the use of a magnetic lens which focusses an electron image of an object on to the target electrode of a television transmitting tube, it will be appreciated that the invention can also be applied as stated above to other forms of cathode ray tubes in which spiral distortion arises as a result of the scanning beam passing through a non-uniform electric retarding field. In such case, deflection of the scanning beam is so arranged that the latter would normally scan a spirally-distorted raster in such a manner that the spiral distortion imposed by the deflecting action will be opposed by the spiral distortion introduced by the non-uniform retarding field with the result that the actual raster scanned by the beam will be of substantially rectangular form.

What I claim is:

1. A circuit arrangement for scanning a cathode ray beam over a target in a cathode ray tube in which an image formed on said target suffers from spiral distortion comprising individual means for deflecting said beam in two separate directions, means for applying deflecting waveforms to said individual means, and means for shaping said waveforms to deflect the beam for tracing a spirally distorted raster corresponding to the spiral distortion of the image.

2. A circuit arrangement for scanning a cathode ray beam to produce a spirally-distorted deflecting action, comprising means for generating sawtooth variations at line and frame frequencies, means for modulating the frame frequency variations with a modulation comprising a combination of line and frame frequency variations, means for modulating the line frequency variations with a modulation comprising a different combination of line and frame frequency variations, and means for deflecting the cathode ray beam by said modulated line and frame frequency variations.

3. A circuit arrangement according to claim 1, wherein said deflecting waveforms are generated by a thermionic valve circuit having means for generating sawtooth variations $x$ and $y$ at line and frame frequencies, means for generating variations of the form $-x^2$ and $-y^2$, means for setting up a variation of the form $-y(x^2+y^2)$ and for combining said last-mentioned variation with variation $x$ to generate a deflecting waveform $x-by(x^2+y^2)$ where $b$ is a constant, and means for setting up variations of the form $x(x^2+y^2)$ and for combining said last-mentioned variation with variation $y$ to generate a deflecting waveform $y+bx(x^2+y^2)$ where $b$ is a constant.

4. A circuit arrangement according to claim 3, comprising means for integrating a fraction of said variations $x$ and $y$ to produce said variations of the form $-x^2$ and $-y^2$.

5. A circuit arrangement according to claim 2, wherein said deflecting waveforms are generated by a thermionic valve circuit having means for generating sawtooth variations $x$ and $y$ at line and frame frequencies, means for generating variations of the form $-x^2$ and $-y^2$, means for setting up a variation of the form $-y(x^2+y^2)$ and for combining said last-mentioned variation with variation $x$ so as to generate a deflecting waveform $x-by(x^2+y^2)$ where $b$ is a constant, and means for setting up variations of the form $x(x^2+y^2)$ and for combining said last mentioned variation with variation $y$ so as to generate a deflecting waveform $y-bx(x^2+y^2)$ where $b$ is a constant.

6. A circuit arrangement according to claim 5, comprising means for integrating a fraction of said variations $x$ and $y$ to produce said variations of the form $-x^2$ and $-y^2$.

7. A circuit arrangement for scanning a cathode ray beam in a non-uniform electric retarding field over a target in a cathode ray tube, whereby said scanning beam is subject to spiral distortion, individual means for deflecting said beam in two separate directions, means for applying deflecting waveforms to said individual means, and means for shaping said waveforms to impart a spirally-distorted deflecting action to said cathode ray beam to counteract substantially the spiral distortion introduced by said non-uniform retarding field.

ERIC LAWRENCE CASLING WHITE.

REFERENCES CITED

The following references are of record in the file of this patent:

UNITED STATES PATENTS

| Number | Name | Date |
|---|---|---|
| 2,274,098 | Shore | Feb. 24, 1942 |
| 2,314,409 | Knoop | Mar. 23, 1943 |
| 2,449,524 | Witherby et al. | Sept. 14, 1948 |
| 2,449,848 | Hefele | Sept. 21, 1948 |
| 2,458,156 | Fredendall | Jan. 4, 1949 |
| 2,466,924 | Bradford et al. | Apr. 12, 1949 |